(12) United States Patent
Drake et al.

(10) Patent No.: US 10,352,566 B2
(45) Date of Patent: Jul. 16, 2019

(54) GAS TURBINE ENGINE COMBUSTOR LINER PANEL

(71) Applicant: United Technologies Corporation, Hartford, CT (US)

(72) Inventors: Christopher Drake, West Hartford, CT (US); Stanislav Kostka, Jr., Middletown, CT (US); Frank J. Cunha, Avon, CT (US)

(73) Assignee: United Technologies Corporation, Farmington, CT (US)

( * ) Notice: Subject to any disclaimer, the term of this patent is extended or adjusted under 35 U.S.C. 154(b) by 574 days.

(21) Appl. No.: 14/896,576

(22) PCT Filed: Apr. 14, 2014

(86) PCT No.: PCT/US2014/034009
§ 371 (c)(1),
(2) Date: Dec. 7, 2015

(87) PCT Pub. No.: WO2015/002686
PCT Pub. Date: Jan. 8, 2015

(65) Prior Publication Data
US 2016/0116166 A1 Apr. 28, 2016

Related U.S. Application Data

(60) Provisional application No. 61/835,153, filed on Jun. 14, 2013.

(51) Int. Cl.
*F23R 3/00* (2006.01)
*F23R 3/06* (2006.01)

(52) U.S. Cl.
CPC .............. *F23R 3/002* (2013.01); *F23R 3/005* (2013.01); *F23R 3/06* (2013.01);
(Continued)

(58) Field of Classification Search
CPC .... F28F 1/124; F28F 1/10; F28F 1/105; F28F 1/12; F28F 2001/027; F01D 5/18–189; F23R 3/002–005; F23R 2900/03043–03045; F23R 3/06; F28D 9/005
See application file for complete search history.

(56) References Cited

U.S. PATENT DOCUMENTS 5,353,865 A 10/1994 Adiutori et al.
6,170,266 B1 1/2001 Pidcock et al.
(Continued)

FOREIGN PATENT DOCUMENTS

EP 2518429 A1 10/2012
WO WO20120133630 A1 10/2012

OTHER PUBLICATIONS

EP search report for EP14820269.0 dated Jul. 4, 2016.
EPO Official Letter dated Feb. 15, 2019 for Application No. 14820269.0.

*Primary Examiner* — Gerald L Sung
*Assistant Examiner* — Rene D Ford
(74) *Attorney, Agent, or Firm* — O'Shea Getz, P.C.

(57) ABSTRACT

A liner panel for a combustor of a gas turbine engine includes a multiple of heat transfer augmentors. At least one of the multiple of heat transfer augmentors includes a hemi-spherical protuberance.

4 Claims, 10 Drawing Sheets

(52) U.S. Cl.
CPC .................. *F05D 2260/2214* (2013.01); *F23R 2900/03041* (2013.01); *F23R 2900/03042* (2013.01); *F23R 2900/03044* (2013.01); *F23R 2900/03045* (2013.01); *Y02T 50/675* (2013.01)

(56) References Cited

U.S. PATENT DOCUMENTS

| | | | |
|---|---|---|---|
| 6,468,669 B1* | 10/2002 | Hasz | C23C 24/10 428/553 |
| 7,820,267 B2* | 10/2010 | Fahndrich | F01D 5/186 219/121.7 |
| 2002/0168537 A1 | 11/2002 | Hasz et al. | |
| 2003/0014560 A1 | 8/2003 | Pidcock et al. | |
| 2003/0145604 A1 | 8/2003 | Pidcock et al. | |
| 2005/0034399 A1* | 2/2005 | Pidcock | F23R 3/002 52/506.1 |
| 2005/0004793 A1 | 3/2005 | Nakae et al. | |
| 2005/0047932 A1 | 3/2005 | Nakae et al. | |
| 2010/0229564 A1 | 9/2010 | Chila | |
| 2011/0011095 A1* | 1/2011 | Ladd | F23R 3/002 60/796 |
| 2011/0016717 A1 | 1/2011 | Morrison et al. | |
| 2012/0025531 A1 | 10/2012 | Miyake | |
| 2012/0255311 A1 | 10/2012 | Miyake | |
| 2014/0020393 A1* | 1/2014 | Nakamata | F23R 3/002 60/754 |

\* cited by examiner

GAS TURBINE ENGINE COMBUSTOR LINER PANEL

This application claims priority to PCT Patent Application No. PCT/US14/34009 filed Apr. 14, 2014, which claims priority to U.S. Patent Appln. No. 61/835,153 filed Jun. 14, 2013.

This disclosure was made with Government support under FA-8650-09-D-2923 0021 awarded by The United States Air Force. The Government has certain rights in this disclosure.

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Advanced engine cycles require the combustor section to operate at high compressor exit temperatures. A survey of typical flight envelopes often require that high compressor exit temperatures exist with reduced supply pressure at high altitude. These operational conditions result in relatively convection and radiation high heat loads.

SUMMARY

A liner panel for a combustor of a gas turbine engine according to one disclosed non-limiting embodiment of the present disclosure includes a multiple of heat transfer augmentors, at least one of the multiple of heat transfer augmentors includes a hemi-spherical protuberance.

In a further embodiment of the present disclosure, the liner panel includes an entrance to at least one passage within a valley formed by a subset of the multiple of heat transfer augmentors.

In a further embodiment of any of the foregoing embodiments of the present disclosure, the at least one passage is an effusion flow passage.

In a further embodiment of any of the foregoing embodiments of the present disclosure, the entrance is within a hemi-spherical depression.

In a further embodiment of any of the foregoing embodiments of the present disclosure, the entrance is centered within the hemi-spherical depression.

In a further embodiment of any of the foregoing embodiments of the present disclosure, the at least one passage defines an angle through the liner panel.

A liner panel for a combustor of a gas turbine engine according to another disclosed non-limiting embodiment of the present disclosure includes a multiple of heat transfer augmentors, wherein a subset of the multiple of heat transfer augmentors define a valley with a hemi-spherical depression.

In a further embodiment of any of the foregoing embodiments of the present disclosure, at least one of the multiple of heat transfer augmentors includes a hemi-spherical protuberance.

In a further embodiment of any of the foregoing embodiments of the present disclosure, an entrance to an effusion flow passage is located within the hemi-spherical depression.

In a further embodiment of any of the foregoing embodiments of the present disclosure, the effusion flow passage defines an angle through the liner panel.

A combustor of a gas turbine engine according to another disclosed non-limiting embodiment of the present disclosure includes a shell with a multiple of impingement flow passages. A liner panel is mounted to the shell. The liner panel includes a multiple of heat transfer augmentors which extend from a cold side thereof toward the shell. At least one of the multiple of heat transfer augmentors includes a hemi-spherical protuberance. A subset of the multiple of heat transfer augmentors defines a valley with a hemi-spherical depression. An entrance to an effusion flow passage is located within the hemi-spherical depression.

A further embodiment of any of the foregoing embodiments of the present disclosure includes a plurality of studs that extend from a cold side of the liner panel.

In a further embodiment of any of the foregoing embodiments of the present disclosure, at least one of the multiple of impingement flow passages is directed toward the hemi-spherical protuberance.

In a further embodiment of any of the foregoing embodiments of the present disclosure, the effusion flow passage defines an angle through the liner panel.

In a further embodiment of any of the foregoing embodiments of the present disclosure, an entrance to an effusion flow passage is located adjacent to the hemi-spherical depression.

In a further embodiment of any of the foregoing embodiments of the present disclosure, an entrance to an effusion flow passage is located within the hemi-spherical depression.

In a further embodiment of any of the foregoing embodiments of the present disclosure, an entrance to an effusion flow passage is centered within the hemi-spherical depression.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
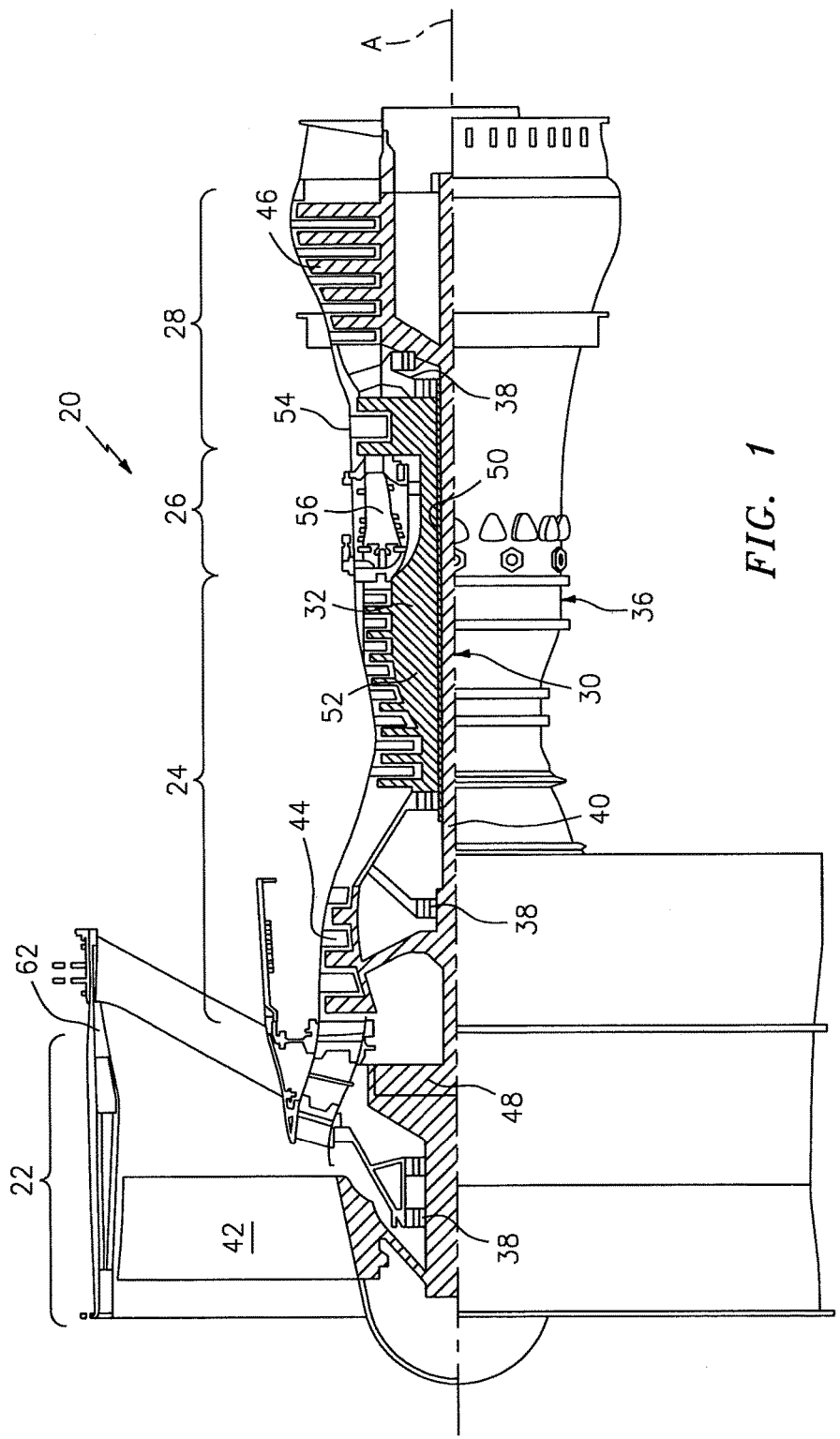
FIG. 1 is a schematic cross-section of an example gas turbine engine architecture.
Figure 2:
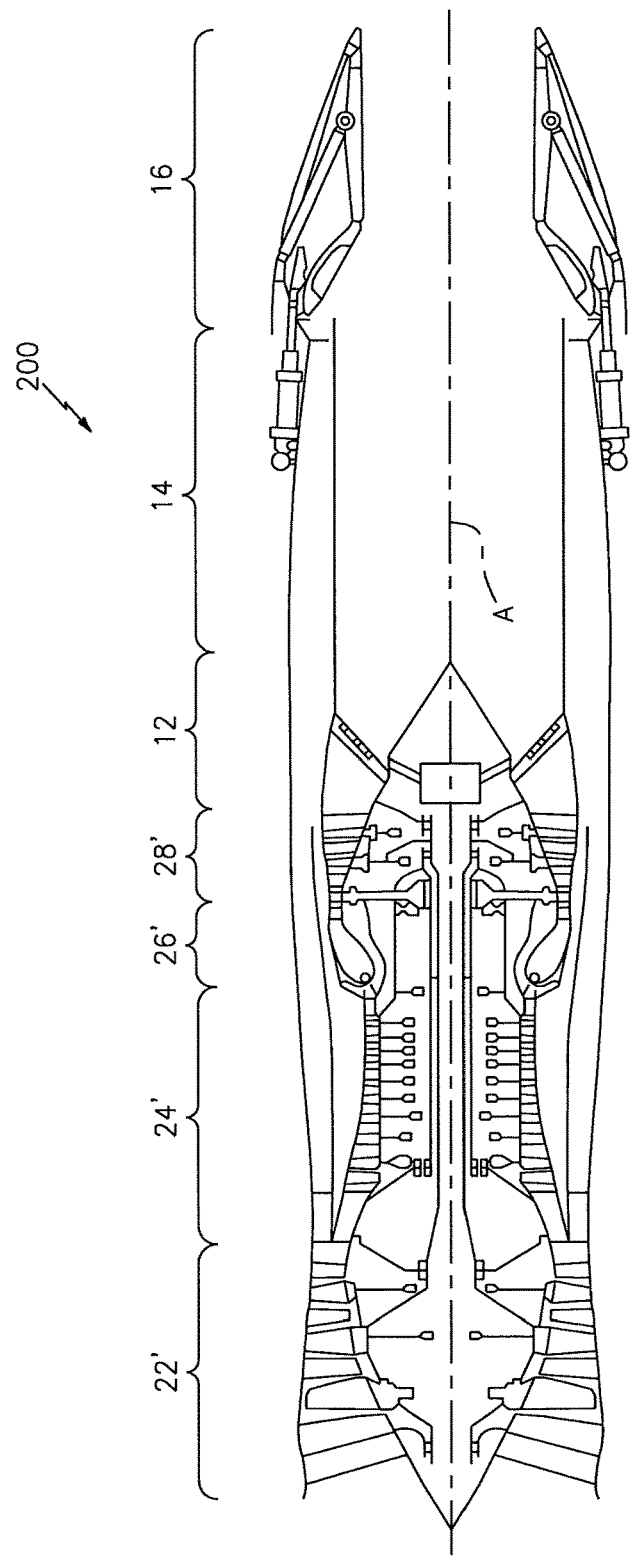
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and a nozzle section 16 in addition to the fan section 22', compressor section 24', combustor section 26' and turbine section 28' (FIG. 2) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis "A" which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
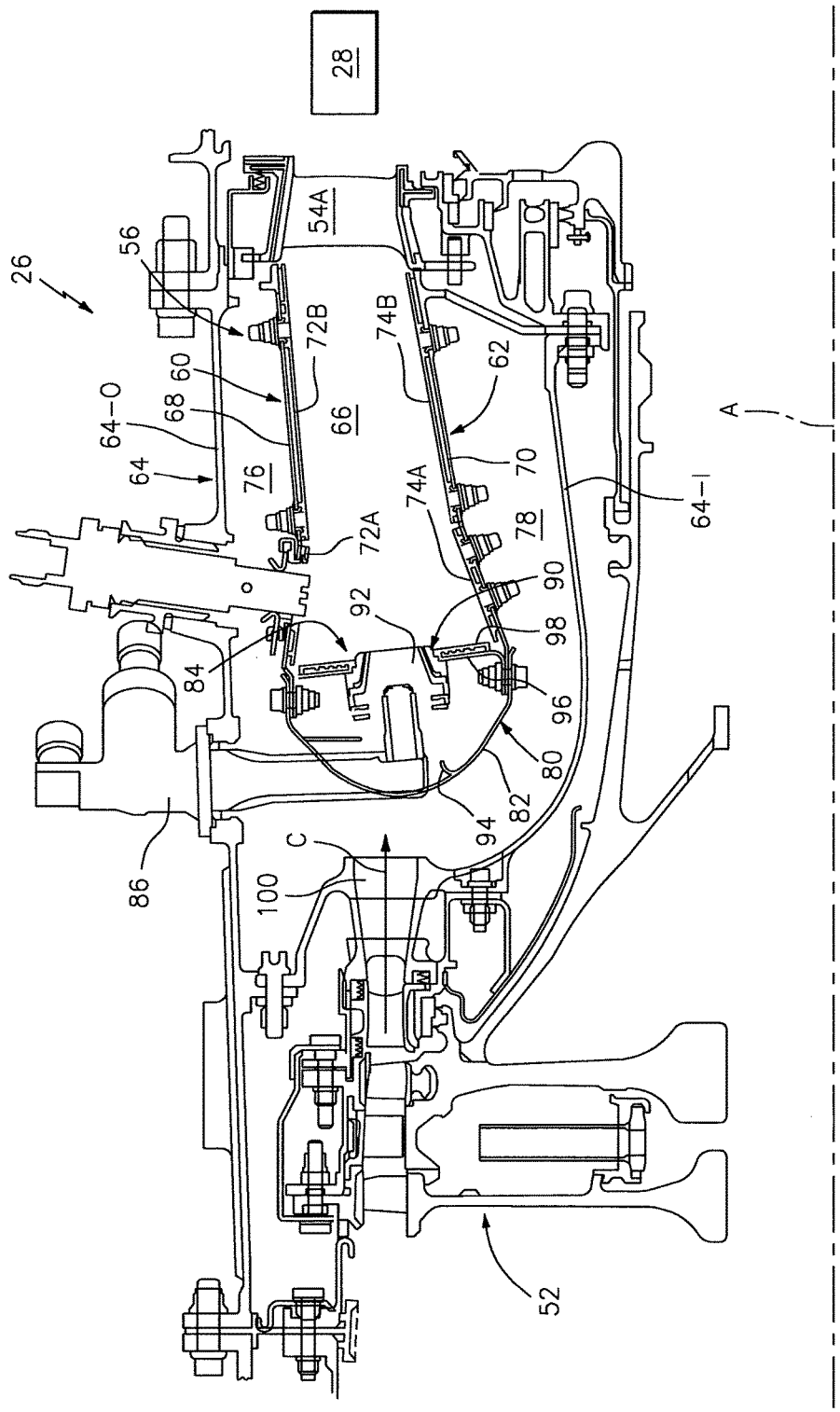
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor liner assembly 60, an inner combustor liner assembly 62 and a diffuser case module 64. The outer combustor liner assembly 60 and the inner combustor liner assembly 62 are spaced apart such that a combustion chamber 66 is defined therebetween. The combustion chamber 66 is generally annular in shape.

The outer combustor liner assembly 60 is spaced radially inward from an outer diffuser case 64-O of the diffuser case module 64 to define an outer annular plenum 76. The inner combustor liner assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor liner assemblies 60, 62 contain the combustion products for direction toward the turbine section 28. Each combustor liner assembly 60, 62 generally includes a respective support shell 68, 70 which supports one or more liner panels 72, 74 mounted to a hot side of the respective support shell 68, 70. Each of the liner panels 72, 74 may be generally rectilinear and manufactured of, for example, a nickel based super alloy, ceramic or other temperature resistant material and are arranged to form a liner array. In one disclosed non-limiting embodiment, the liner array includes a multiple of forward liner panels 72A and a multiple of aft liner panels 72B that are circumferentially staggered to line the hot side of the outer shell 68 (also shown in FIG. 4). A multiple of forward liner panels 74A and a multiple of aft liner panels 74B are circumferentially staggered to line the hot side of the inner shell 70.

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown). Each of the fuel nozzle guides 90 is circumferentially aligned with one of the hood ports 94 to project through the bulkhead assembly 84. Each bulkhead assembly 84 includes a bulkhead support shell 96 secured to the combustor liner assemblies 60, 62, and a multiple of circumferentially distributed bulkhead liner panels 98 secured to the bulkhead support shell 96 around the central opening 92.

The annular hood 82 extends radially between, and is secured to, the forward most ends of the combustor liner assemblies 60, 62. The annular hood 82 includes a multiple of circumferentially distributed hood ports 94 that accommodate the respective fuel nozzle 86 and introduce air into the forward end of the combustion chamber 66 through a central opening 92. Each fuel nozzle 86 may be secured to the diffuser case module 64 and project through one of the hood ports 94 and through the central opening 92 within the respective fuel nozzle guide 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
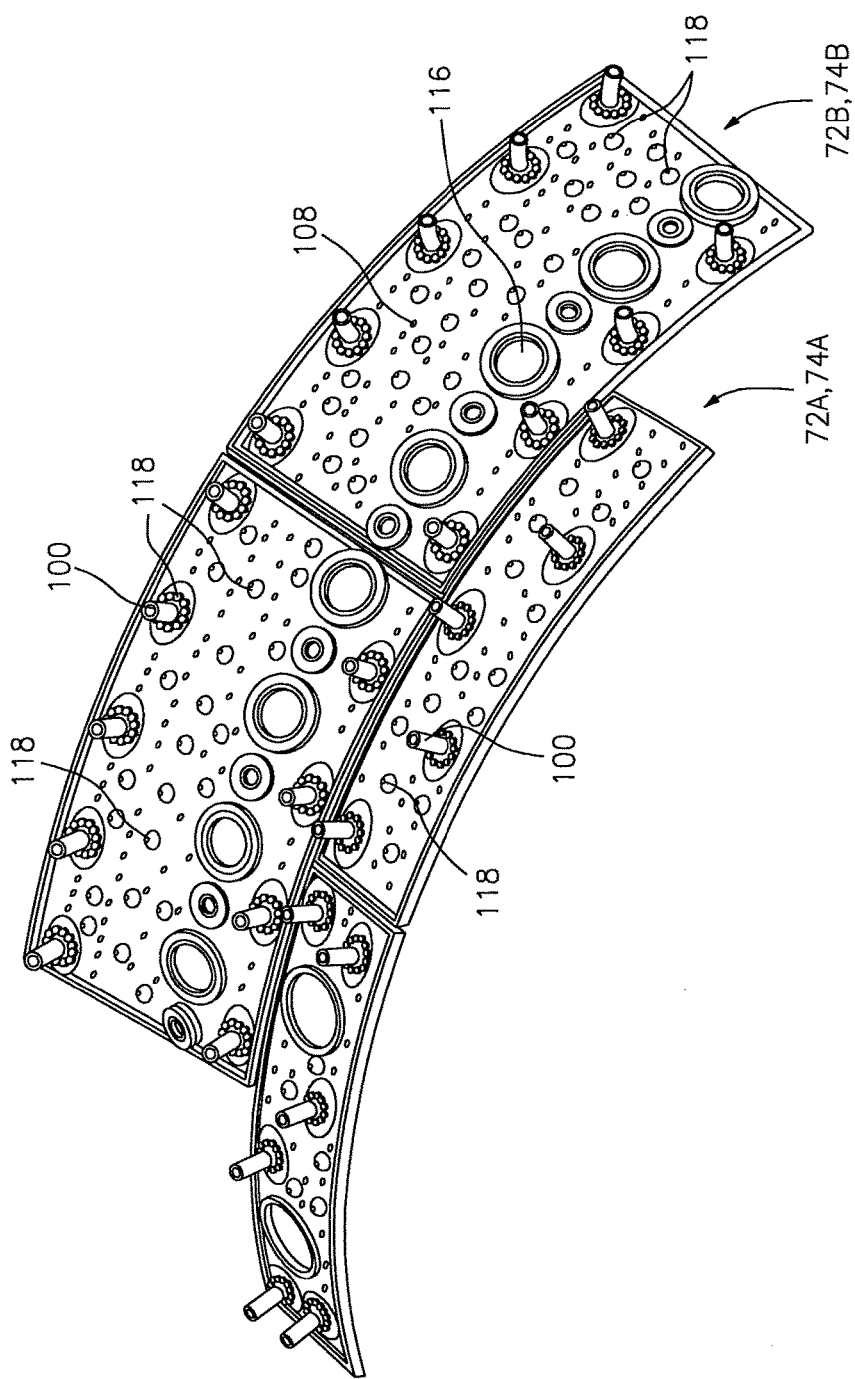
FIG. 4 is an expanded perspective view of a liner panel array from a cold side.
Figure 5:
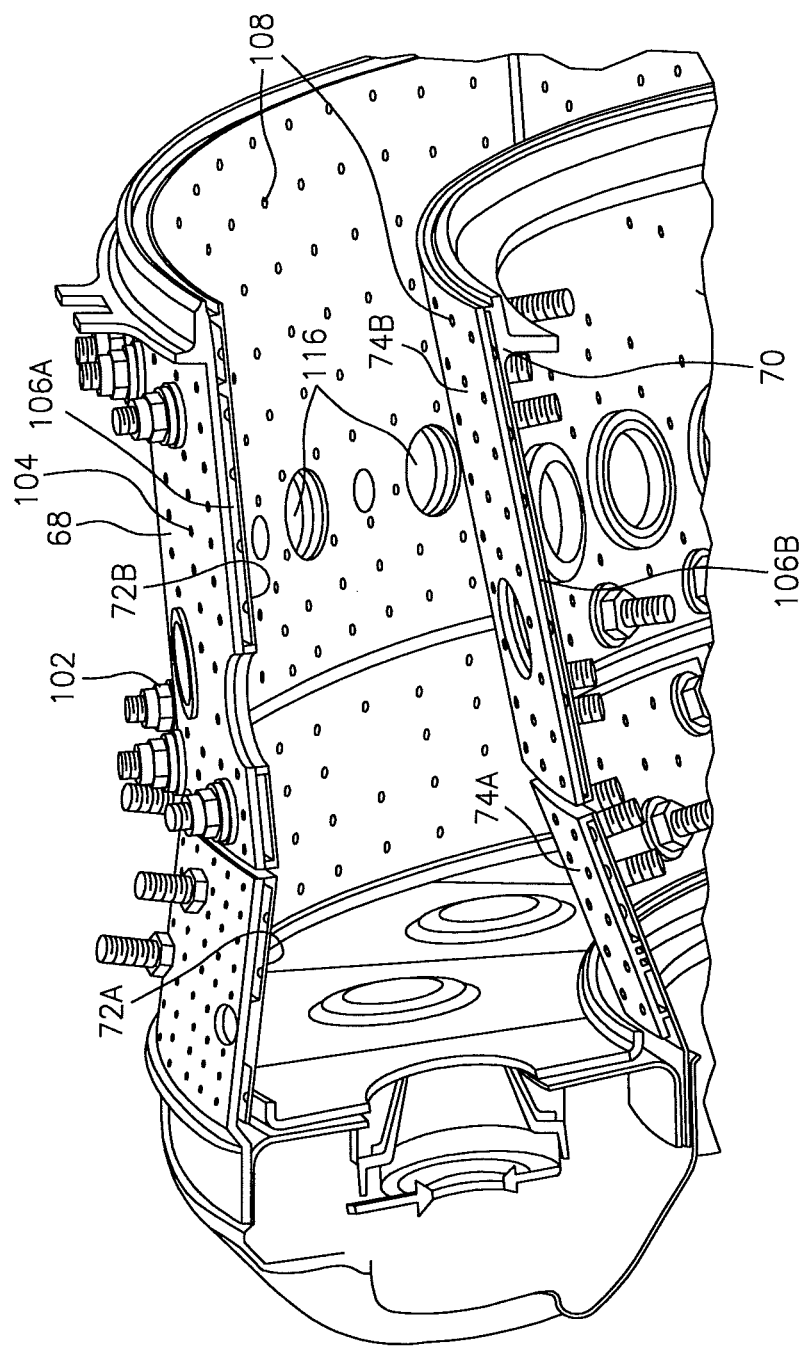
FIG. 5 is a perspective partial longitudinal sectional view of the combustor section.

With reference to FIG. 4, a multiple of studs 100 extend from the liner panels 72, 74 so as to permit the liner panels 72, 74 to be mounted to their respective support shells 68, 70 with fasteners 102 such as nuts (shown in FIG. 5). That is, the studs 100 project rigidly from the liner panels 72, 74 and through the respective support shells 68, 70 to receive the fasteners 102 at a threaded distal end section thereof.

A multiple of cooling impingement passages 104 penetrate through the support shells 68, 70 to allow air from the respective annular plenums 76, 78 to enter cavities 106A, 106B (also shown in FIG. 6) formed in the combustor liner assemblies 60, 62 between the respective support shells 68, 70 and liner panels 72, 74. The cooling impingement passages 104 are generally normal to the surface of the liner panels 72, 74. The air in the cavities 106A, 106B provides cold side impingement cooling of the liner panels 72, 74 that is generally defined herein as heat removal via internal convection.

A multiple of effusion passages 108 penetrate through each of the liner panels 72, 74. The geometry of the passages, e.g., diameter, shape, density, surface angle, incidence angle, etc., as well as the location of the passages with respect to the high temperature main flow also contributes to effusion film cooling. The combination of impingement passages 104 and effusion passages 108 may be referred to as an Impingement Film Floatwall (IFF) assembly.

The effusion passages 108 allow the air to pass from the cavities 106A, 106B defined in part by a cold side 110 of the liner panels 72, 74 to a hot side 112 of the liner panels 72, 74 and thereby facilitate the formation of thin, cool, insulating blanket or film of cooling air along the hot side 112. The effusion passages 108 are generally more numerous than the impingement passages 104 to promote the development of film cooling along the hot side 112 to sheath the liner panels 72, 74. Film cooling as defined herein is the introduction of a relatively cooler air at one or more discrete locations along a surface exposed to a high temperature environment to protect that surface in the region of the air injection as well as downstream thereof.

A multiple of dilution passages 116 may penetrate through both the respective support shells 68, 70 and liner panels 72, 74 along a common axis D (FIG. 5). For example only, in a Rich-Quench-Lean (R-Q-L) type combustor, the dilution passages 116 are located downstream of the forward assembly 80 to quench the hot combustion gases within the combustion chamber 66 by direct supply of cooling air from the respective annular plenums 76, 78.

Some engine cycles and architectures demand that the gas turbine engine combustor 56 operate at relatively high compressor exit temperatures aft of the HPC 52—referred to herein as T3. As further perspective, T1 is a temperature in front of the fan section 22; T2 is a temperature at the leading edge of the fan 42; T2.5 is the temperature between the LPC 44 and the HPC 52; T3 is the temperature aft of the HPC 52; T4 is the temperature in the combustion chamber 66; T4.5 is the temperature between the HPT 54 and the LPT 46; and T5 is the temperature aft of the LPT 46 (FIG. 1). These engine cycles and architectures also result in a further requirement that the high compressor exit temperatures exist in concert with a cooling air supply pressure decrease at higher altitudes. That is, available pressures may not be sufficient for cooling requirements at high altitudes as the heat transfer capability of the liner panels 72, 74 decrease by a factor of about two (2) as supply pressures decreases from, for example, sea level ram air flight conditions to higher altitude up and away flight conditions. The increased internal heat transfer coefficient of, for example, 400 F (204 C) at T3 for these engine cycles and architectures thereby indicates a required increased heat transfer multiplier of approximately three hundred percent (300%) to a sustainable metal temperature of the liner panel 72, 74.

Figure 6:
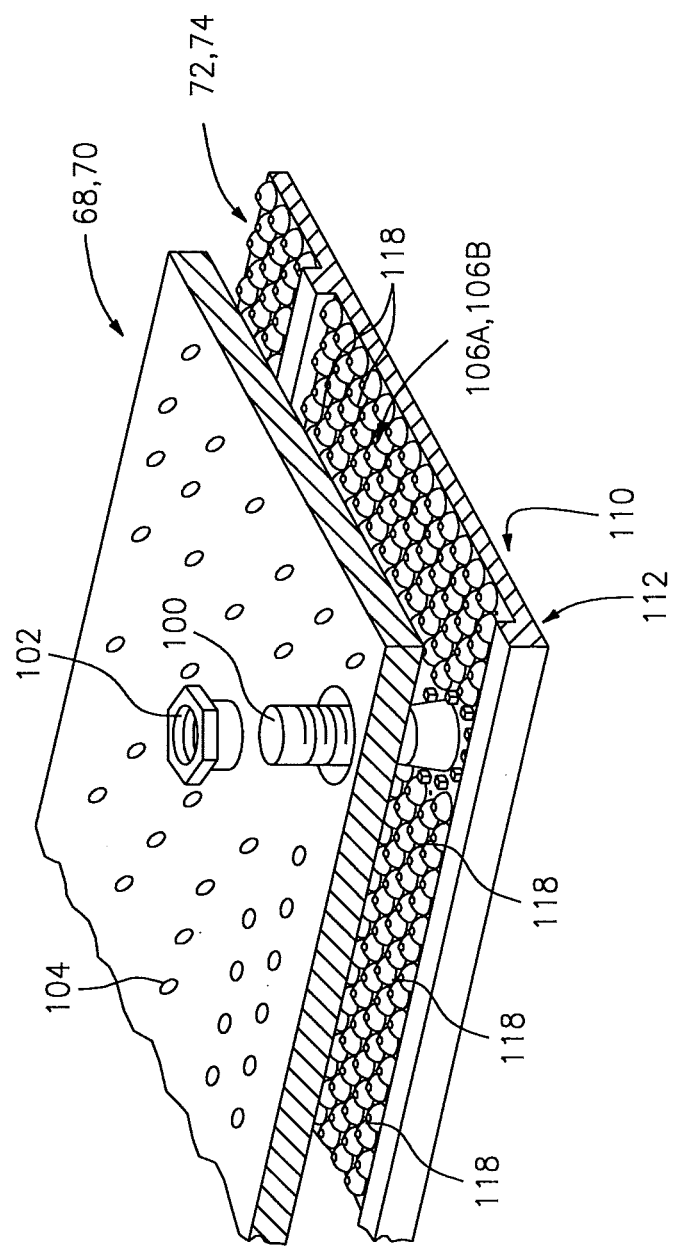
FIG. 6 is an exploded view of a liner assembly of the combustor.

With reference to FIG. 6, a multiple of heat transfer augmentors 118 extend from the cold side 110 of each liner panel 72, 74 to increase heat transfer. The support shells 68, 70 and liner panels 72, 74 may be manufactured via an additive manufacturing process that facilitates incorporation of the relatively small heat transfer augmentors 118 as well as the cooling impingement passages 104, the effusion passages 108, dilution passages 116 and or other features. One additive manufacturing process includes powder bed metallurgy in which layers of powder alloy such as nickel, cobalt, or other material is sequentially build-up by systems from, for example, Concept Laser of Lichtenfels, DE and EOS of Munich, DE, e.g. direct metal laser sintering or electron beam melting.

Figure 7:
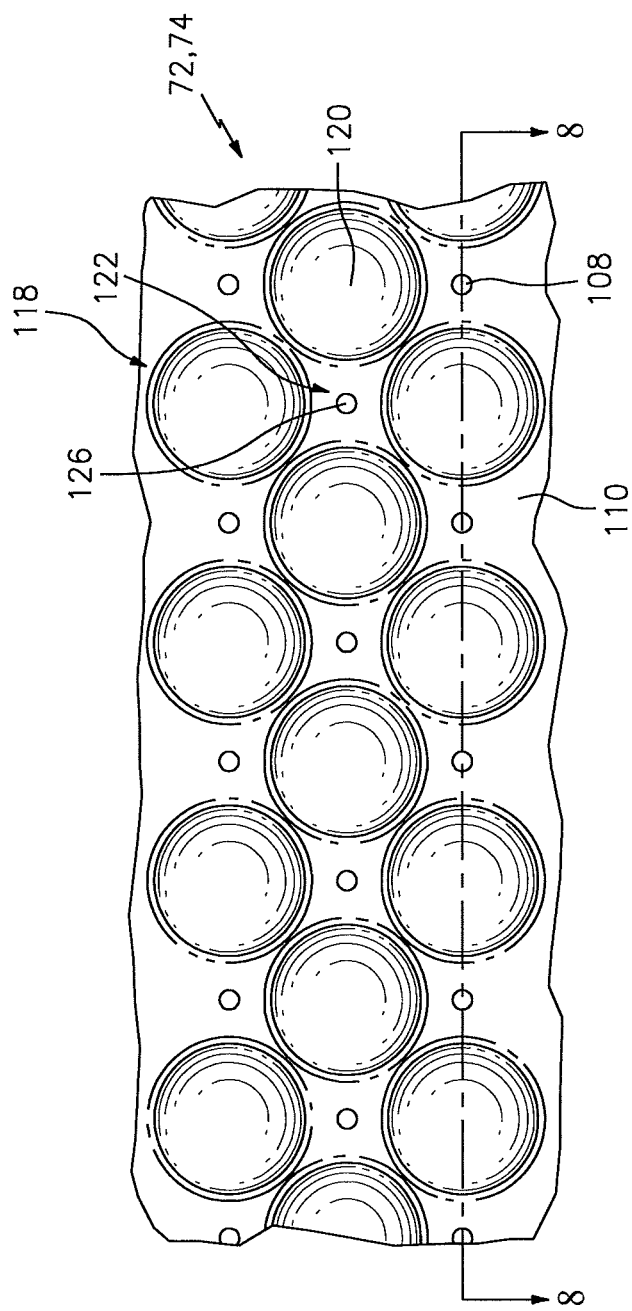
FIG. 7 is a cold side view of a combustor liner panel with a multiple of heat transfer augmentors according to one disclosed non-limiting embodiment.

With reference to FIG. 7, in one disclosed non-limiting embodiment, each of the multiple of heat transfer augmentors 118 define a hemi-spherical protuberance 120 which flank a valley 122 that contains an entrance 126 to each effusion passages 108. In this disclosed non-limiting embodiment, each effusion passage 108 is located in a valley 122 that is defined by a subset of four (4) hemi-spherical protuberances 120; however, other geometries will also benefit herefrom.

In this disclosed non-limiting embodiment, the multiple of cooling impingement the passages 104 (FIG. 6) penetrate through the support shells 68, 70 to allow air from the respective annular plenums 76, 78 to impinge onto each of hemi-spherical protuberance 120. That is, the multiple of cooling impingement the passages 104 may be directed toward at least one of the multiple of hemi-spherical protuberances 120 such that the impingement air will turbulate. After the air is turbulated off the hemi-spherical protuberances 120, a pressure drop across the liner panel 72, 74 develops to facilitate navigation of the air into the effusion passages 108 then into the combustion chamber 66.

Cooling effectiveness of the liner panel 72, 74 is dependent on a number of factors, one of which is the heat transfer coefficient. This heat transfer coefficient depicts how well heat is transferred from the liner panel 72, 74, to the cooling air. As the liner panel 72, 74 surface area increases, this coefficient increases due to a greater ability to transfer heat to the cooling air. Turbulation of the air also increases this heat transfer. The hemi-spherical protuberances 120 increase these two factors, and thereby increase the cooling ability of the line panel 72, 74.

Figure 8:
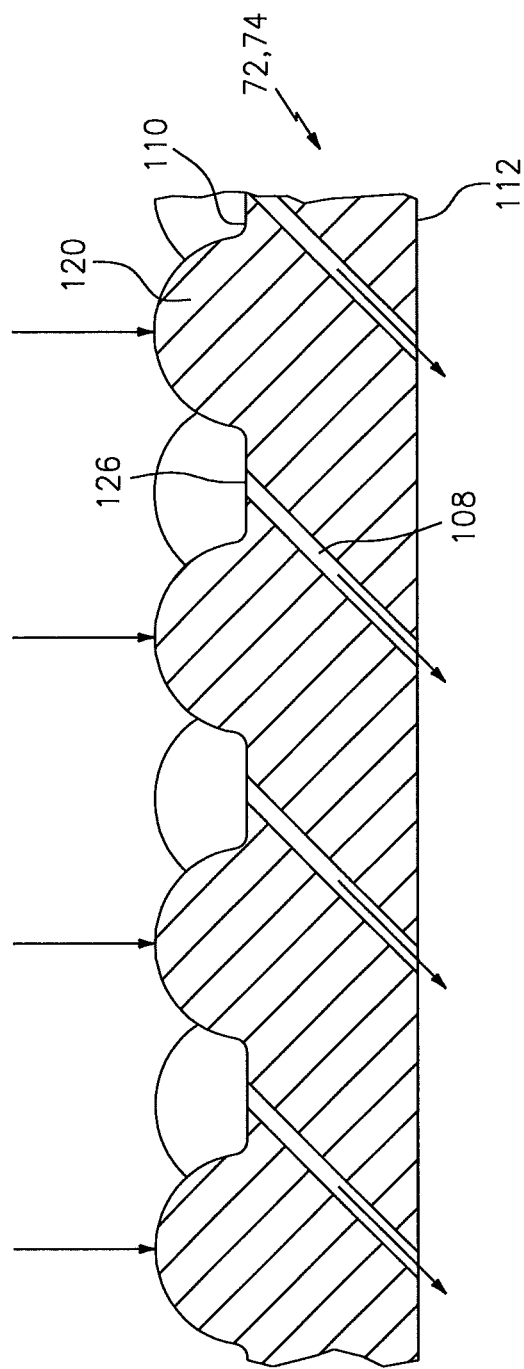
FIG. 8 is a sectional view of the multiple of heat transfer augmentors of FIG. 7.

The multiple of heat transfer augmentors 118 increase surface area, promote turbulence, increase thermal efficiency, and facilitates film cooling as the spent impingement flow follows the direction towards effusion passages 108 (FIG. 8). The heat transfer relies primarily on the surface heat transfer augmentors 118 and the attributes thereof. In general, flow transition from the stagnation impingement flow to turbulence follows the mechanism associated with turbulence creation through unstable Tollmien-Schiliting waves, three-dimensional instability, then by vortex breakdown in a cascading process which leads to intense flow fluctuations and energy exchange or high heat transfer. This natural process facilitated by the multiple of heat transfer augmentors 118 allow for high energy exchange, produce turbulence, coalescence of turbulence spot assemblies and redirect flow towards more sensitive heat transfer areas, along with flow reattachment. All these factors lead to intense energy transport.

Figure 9:
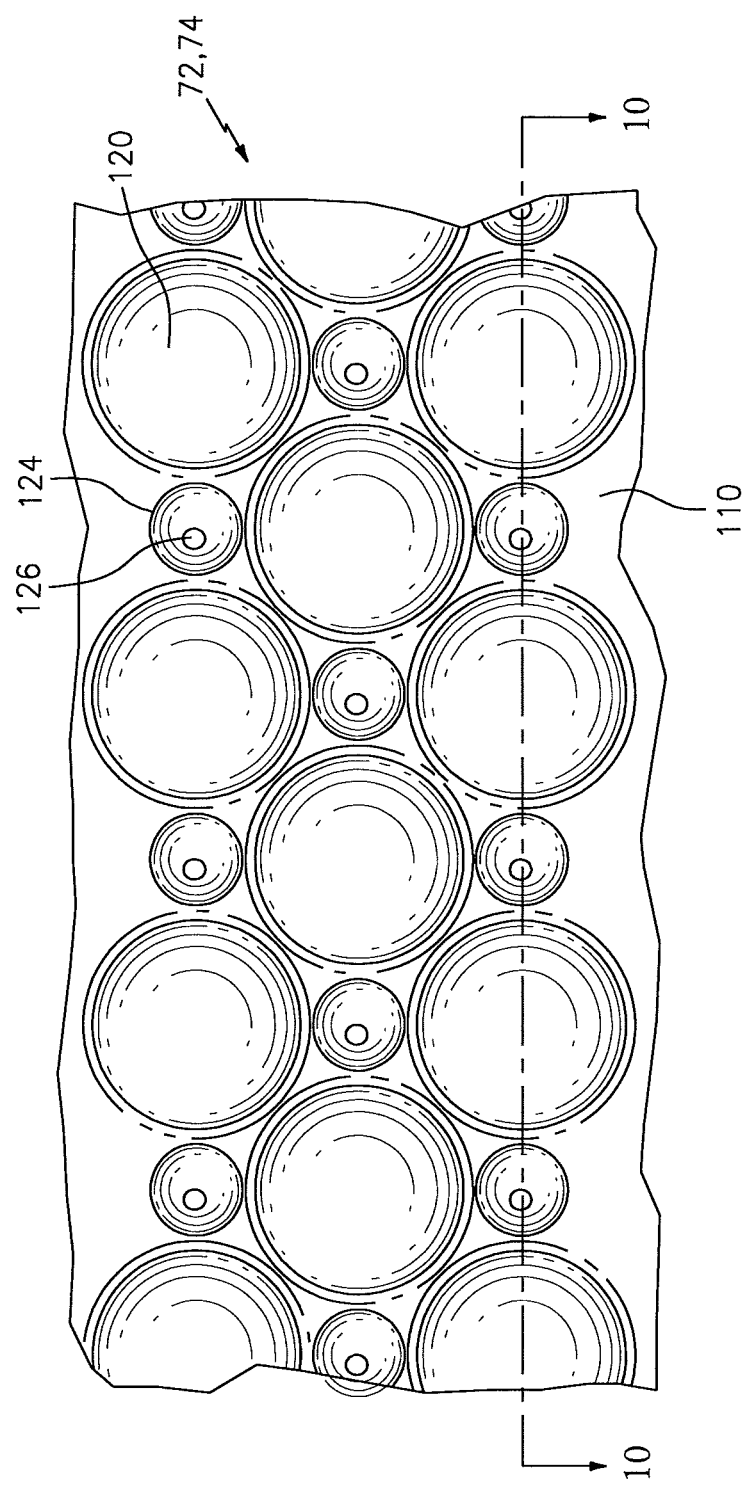
FIG. 9 is a cold side view of a combustor liner panel with a multiple of heat transfer augmentors according to another disclosed non-limiting embodiment.
Figure 10:
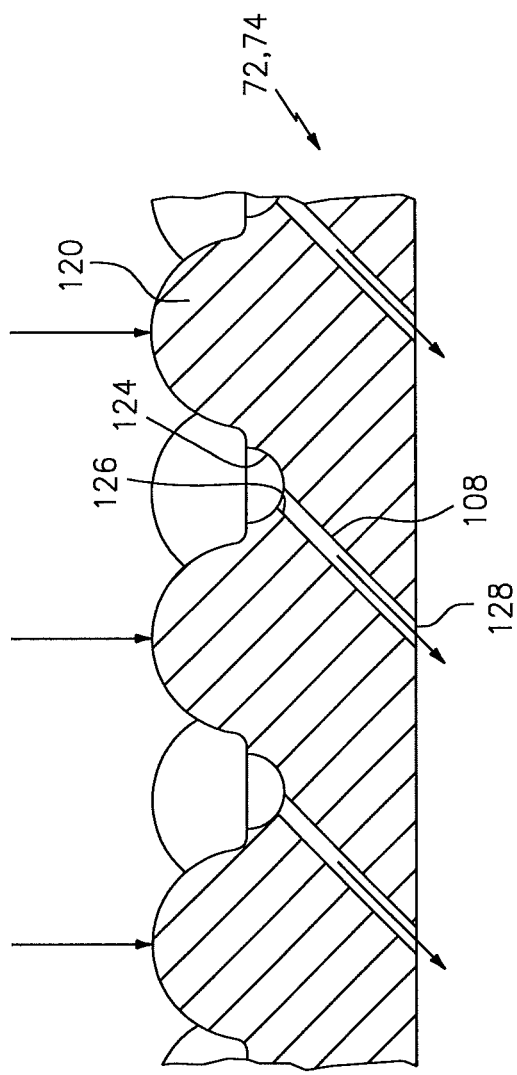
FIG. 10 is a sectional view of the combustor liner panel of FIG. 9.

With reference to FIG. 9, in another disclosed non-limiting embodiment, each effusion passage 108 defines an entrance 126 located within a hemi-spherical depression 124. That is, the hemi-spherical depression 124 are recesses into the cold side 110 of each liner panel 72, 74 such that the hemi-spherical depression 124 facilitates capture and direction of air into each of the effusion passages 108. The entrance 126 may be displaced from an exit 128 of the effusion passages 108 such that the effusion passage 108 defines an angle through each liner panel 72, 74 (FIG. 10). That is the effusion passage 108 need not be perpendicular through each liner panel 72, 74.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A combustor of a gas turbine engine comprising:
   a shell with a multiple of impingement flow passages; and
   a liner panel mounted to said shell, said liner panel having a cold side surface and an opposing hot side surface, the cold side surface facing the shell;
   a multiple of heat transfer augmentors extending outwardly from the cold side surface toward said shell, wherein the multiple of heat transfer augmentors includes a plurality of augmentor subsets and each subset defines a valley;
   wherein a depression is disposed in the cold side surface within each valley, and an effusion passage that extends through the liner panel between the cold side surface and the hot side surface is in fluid communication with the depression, the effusion passage having an entrance disposed within the depression;
   wherein the effusion flow passage entrance is centered within said depression.

2. The combustor as recited in claim 1, further comprising a plurality of studs which extend from a cold side of said liner panel.

3. The combustor as recited in claim 1, wherein the multiple of heat augmentors are configured as hemi-spherical protuberances.

4. The combustor as recited in claim 1, wherein the depression is configured as a hemi-spherical depression.

\* \* \* \* \*